(12) United States Patent
Elmore

(10) Patent No.: US 12,458,462 B2
(45) Date of Patent: Nov. 4, 2025

(54) SURGICAL ANGULATION MEASUREMENT INSTRUMENT FOR ORTHOPEDIC INSTUMENTATION SYSTEM

(76) Inventor: Ranell Elmore, Fontana, CA (US)

( * ) Notice: Subject to any disclaimer, the term of this patent is extended or adjusted under 35 U.S.C. 154(b) by 864 days.

(21) Appl. No.: 13/310,721

(22) Filed: Feb. 21, 2012

(65) Prior Publication Data

US 2013/0218166 A1 Aug. 22, 2013

(51) Int. Cl.
*A61B 90/00* (2016.01)
*A61B 17/70* (2006.01)

(52) U.S. Cl.
CPC .......... *A61B 90/06* (2016.02); *A61B 17/7001* (2013.01); *A61B 2090/067* (2016.02)

(58) Field of Classification Search
CPC ........ A61B 2090/068; A61B 2090/067; A61B 17/7001; A61B 2017/681; A61B 90/06
USPC ................................................ 606/102, 104
See application file for complete search history.

(56) References Cited

U.S. PATENT DOCUMENTS

| | | | |
|---|---|---|---|
| 7,273,158 B1* | 9/2007 | Dean .................... | A63B 47/002 221/270 |
| 2005/0021044 A1* | 1/2005 | Stone .................... | A61B 17/175 606/102 |
| 2010/0217246 A1* | 8/2010 | Reeves .................. | A61B 50/20 606/1 |

* cited by examiner

*Primary Examiner* — Olivia C Chang
(74) *Attorney, Agent, or Firm* — Barry Choobin; Patent 360

(57) ABSTRACT

A surgical angulation measurement instrument of the instant invention includes a positioning measurer and a positioning reader linked to the positioning measurer. The positioning measurer detachably couples with a tool which is used to implant the pedicle screw. In response to the orientation of the tool, the orientation of the pedicle screw is measured by the positioning measurer with respect to a pedicle axis of screw placement. The positioning reader indicates the orientation of the pedicle screw and notifies the orientation of the pedicle screw being aligned with the pedicle axis of screw placement.

11 Claims, 8 Drawing Sheets

SURGICAL ANGULATION MEASUREMENT INSTRUMENT FOR ORTHOPEDIC INSTUMENTATION SYSTEM

BACKGROUND

1. Field of the Invention

The present invention relates to orthopedic instrumentation systems. More particularly, the present invention relates to a surgical angulation measurement instrument for an orthopedic instrumentation system to improve surgical outcomes of misalignment of the pedicle screws and to allow for a precise measurement of the pedicle screw angle trajectory (lateral, medial, cephalic, and/or caudal).

2. Discussion of the Related Art

Use of pedicle screw systems for spinal stabilization has become increasingly common in spine surgery. Specifically, the pedicle screw system comprises two or more pedicle screws are inserted through the pedicle and into the vertebral body and a linkage unit, such as a rod/plate, attached the pedicle screws in such a way that the linkage unit is oriented parallel to the spinal column. Generally speaking, two pedicle screws are used as a pair to attach to two sides of the spinal column in order to stabilize a particular segment of the spine.

The initial procedure of the pedicle screw fixation is to stabilize the patient spine position by locating the correct orientation of the pedicle screws. A fluoroscopy device is generally used for guidance of pedicle screw placement, wherein fluoroscopic images of the spine are obtained and calibrated. Then, a pedicle pilot hole is formed under virtual fluoroscopic guidance by a tracked awl and a tracked pedicle probe. The first pedicle screw can be placed within the pedicle by a driving tool such as a pedicle driver or awl, whereas a fluoroscopic image is obtained to confirm the placement of the first pedicle screw. A second pedicle screw is then placed at the contralateral side of the spine whereas another fluoroscopic image is obtained to confirm the placement of the second pedicle screw with respect to the first pedicle screw. Because of anatomical variations, the two pedicle screws being fixed to one another in the pedicle screw fixation may not be in alignment with one another and may cause injury to the spinal cord. The first and/or second pedicle screws may be removed and re-inserted until the first and second pedicle screws are placed in a corrected orientation and are aligned with each other.

The major disadvantage of the pedicle screw fixation is that the orientation of the pedicle screw is determined by the experience of the operator through visible observation and predication. An improper penetration of the pedicle cortex can result in dural or neural injury. A required lateral to medial orientation is important for optimal screw trajectory. Further, the procedure of the pedicle screw fixation is costly and complicated to ensure the orientation of each pedicle screw. The patient must be exposed to fluoroscopy and anesthesia for long periods of time before and potentially after the pedicle screw fixation. Specifically, multiple fluoroscopic images must be obtained to ensure the orientation of the pedicle screw for each insertion. The surgical time is relatively long that the lengthy surgical time with potential for significant blood loss and increased risk of infection.

BRIEF SUMMARY OF THE INVENTION

The present invention overcomes the above mentioned drawbacks and limitation by incorporating a surgical angulation measurement instrument with an orthopedic instrumentation system.

The primary objective of the present invention is that the surgical angulation measurement instrument improves surgical outcomes of misalignment of the pedicle screw and allows for a precise measurement of the pedicle screw angle (lateral, medial, cephalic, caudal as well as depth of penetration).

Another objective of the present invention is that the surgical angulation measurement instrument improves bilateral symmetry, decrease fluoroscopy exposure, and reduced operating room times.

Another objective of the present invention is that the surgical angulation measurement instrument is readily available, disposable and inexpensive.

Another objective of the present invention is that the surgical angulation measurement instrument will generate a notifying signal once the desired angle of the pedicle screw has been achieved.

Another objective of the present invention is that the surgical angulation measurement instrument has multi-directional capability for a precise measurement of the pedicle screw angle.

Another objective of the present invention is that the surgical angulation measurement instrument is compatible with any orthopedic instrument system.

Another objective of the present invention is that the surgical angulation measurement instrument can also be considered as the tool simulator for the surgeon to practice the use of the tool and to get the feeling of how to adjust the tool with the orientation of the pedicle screw to align with the pedicle axis of screw insertion before the operation of the screw placement, so as to further save the operating room time for screw placement.

The surgical angulation measurement instrument of the instant invention comprises a positioning measurer and a positioning reader linked to the positioning measurer. The positioning measurer detachably couples with a tool which is used to implant the pedicle screw. In response to the orientation of the tool, the orientation of the pedicle screw can be measured by the positioning measurer with respect to a pedicle axis of screw placement. The positioning reader indicates the orientation of the pedicle screw and notifies the operator of the pedicle screw being aligned with the pedicle axis of screw placement.

The positioning measurer and the positioning reader can be formed in one casing to detachably couple with the tool, preferably at the elongated shaft of the tool.

The positioning measurer and the positioning reader can be two individual units and can be wirelessly connected with each other through any wireless link such as "Bluetooth".

The positioning reader will generate a notifying signal, such as light signal or/and label sound signal, to notify the orientation of the pedicle screw being aligned with the pedicle axis of screw placement.

The positioning measurer can be built-in with the tool. The positioning reader can also be built-in with the tool or forms as an individual device to wirelessly link to the positioning measurer.

For a more complete understanding of the present invention with its objectives and distinctive features and advantages, reference is now made to the following specification and to the accompanying drawings.

BRIEF DESCRIPTION OF THE DRAWING(S)

DETAILED DESCRIPTION OF THE INVENTION

In accordance with a preferred embodiment of the present invention, the present invention provides a surgical angulation measurement instrument for a pedicle screw of an orthopedic instrumentation system, wherein a tool of the orthopedic instrumentation system is used to implant the pedicle screw into a pedicle and/or vertebral body of a patient for spinal stabilization. The tool can be an awl probe or a T-handle pedicle screwdriver to drive the pedicle screw to the pedicle and vertebral body of the patient.

Generally, the surgical angulation measurement instrument of the instant invention comprises a positioning measurer and a positioning reader linked to the positioning measurer. The positioning measurer provided at the tool to implant the pedicle screw and measures an orientation of the pedicle screw with respect to a pedicle axis of screw placement. The positioning reader indicates the orientation of the pedicle screw and notifies the orientation of the pedicle screw being aligned with the pedicle axis of screw placement.

In order to determine the pedicle axis of screw placement, the vertebral body should be visualized with fluoroscopic imaging in axial, sagittal, and coronal planes, wherein the appropriate insertion point for each pedicle must be identified and marked. The orientation of the pedicle screw to be placed into the pedicle and/or vertebral body along the pedicle axis of screw placement with respect to the vertebral body orientation.

The pedicle screw can be a straight screw or an angled screw being inserted into the vertebral body in which the screw axis should be aligned with the pedicle axis of screw placement. The surgical angulation measurement instrument of the instant invention can precisely control the screw axis of the pedicle screw to be aligned with the vertebral body orientation.

Figure 1:
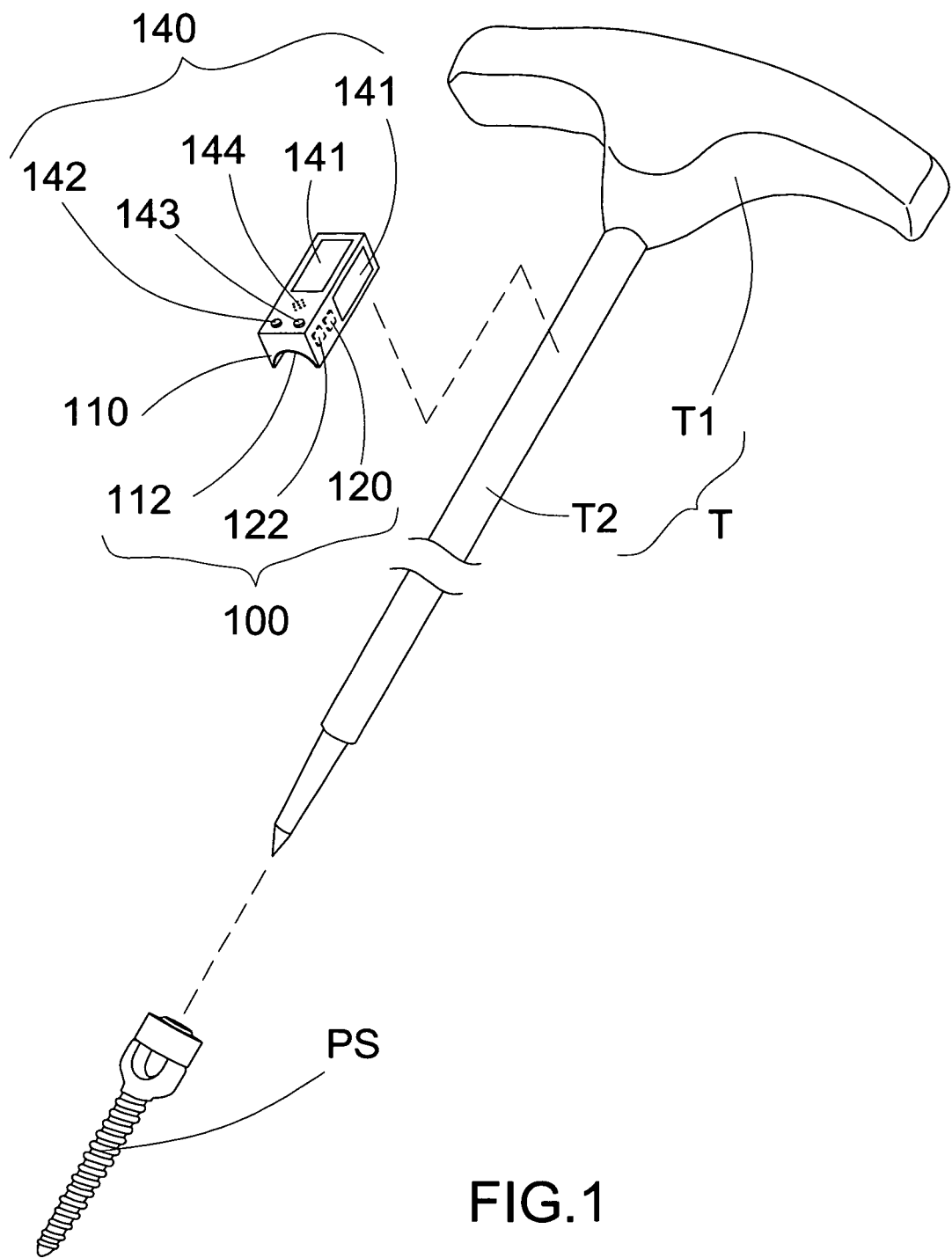
FIG. 1 is a schematic view of a surgical angulation measurement instrument in accordance with the present invention, showing the surgical angulation measurement instrument detachably coupling with a tool of an orthopedic instrumentation system.
Figure 2:
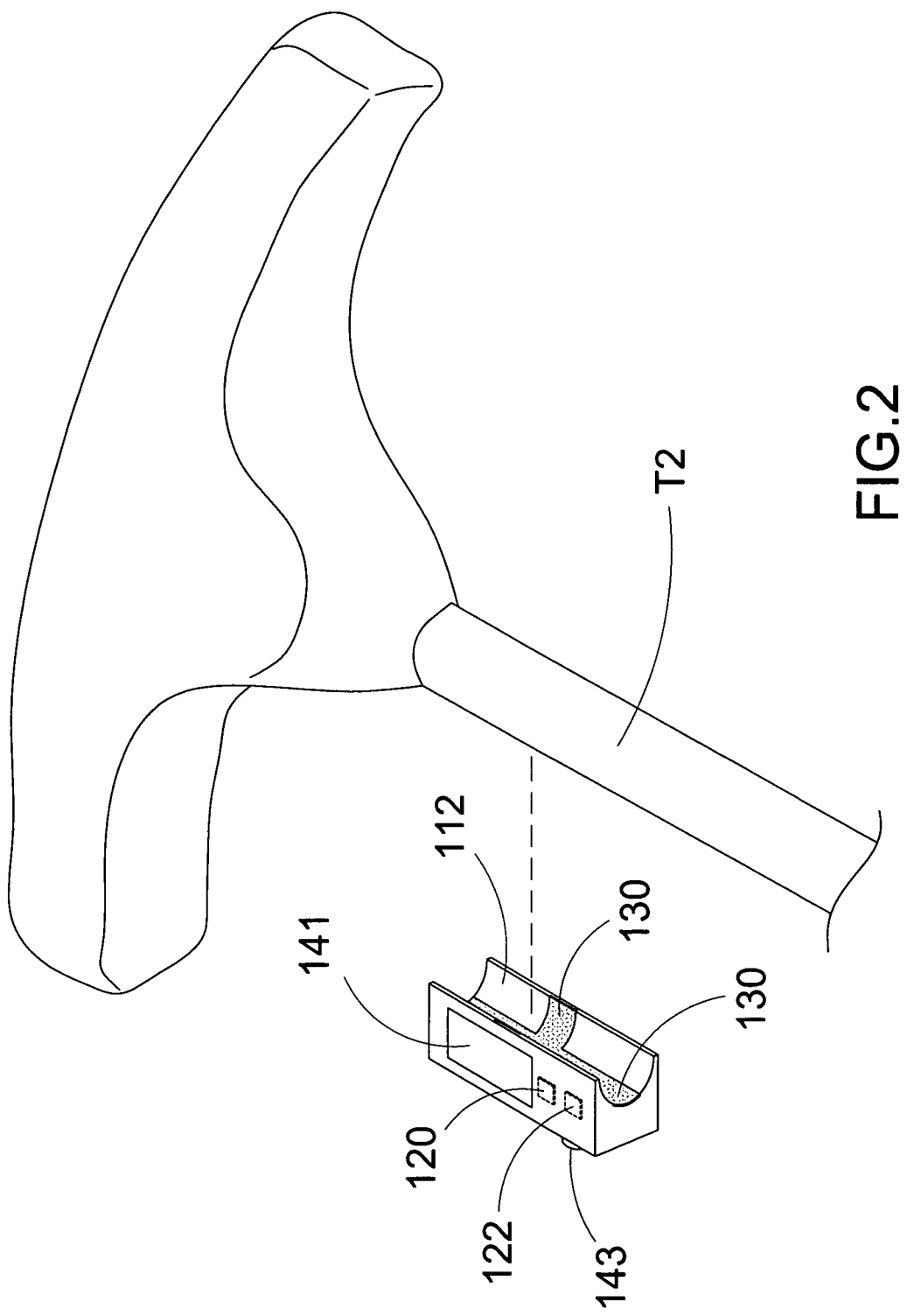
FIG. 2 is a rear view of the surgical angulation measurement instrument in accordance with the present invention, showing the magnetic attachment of the surgical angulation measurement instrument.

FIGS. 1 and 2 depict the surgical angulation measurement instrument of the instant invention to be incorporated with the pedicle screwdriver of the tool T having a handle portion T1 and an elongated shaft T2, The surgical angulation measurement instrument comprises a positioning measurer 100 and a positioning reader 140 linked to the positioning measurer 100.

The positioning measurer 100 comprises a casing 110 for detachably coupling with the tool T and a leveling device 120 received in the casing 110 for measuring the orientation of the pedicle screw PS. The casing 110 is preferably coupled at the elongated shaft T2 to measure the orientation of the elongated shaft T2 of the tool T. The casing 110 is preferably formed approximately 1.5 inches wide and 3 inches long. As being known the axial orientation between the elongated shaft T2 of the tool T and the screw axis of the pedicle screw PS, the orientation of the pedicle screw PS can be measured by the leveling device 120.

The casing 110 preferably has an elongated box shape defining a top surface, a bottom surface, a front surface, a rear surface, and two side surfaces. The rear surface of the casing 110 forms an attachment surface 112 to couple at the handle portion T1 of the tool T. The attachment surface 112 of the casing 110 forms a concave surface and has a curvature corresponding to the curvature of the elongated shaft T2. It is preferred the curvature of the attachment surface 112 of the casing 110 matches with the curvature of the elongated shaft T2 to fit and couple the casing 110 at the elongated shaft T2.

A coupling device 130 is provided at the casing 110 for detachably coupling the positioning measurer 100 to the tool T. The coupling means 130 provides a magnetic attachment for the casing 110 to magnetically couple the casing 110 to the tool T. In FIG. 2, the coupling device 130 comprises one or more magnetic strips formed at the attachment surface 112 of the casing 110. The magnetic strip can be magnetically attached to the elongated shaft T2 of the tool T which is made of metal having a magnetically attaching ability. The magnetic strip is embedded into the attachment surface 112 of the casing 110 so that the attachment surface 112 forms a continuous concave surface to fit along the elongated shaft T2 of the tool T. Preferably, at least one magnetic strip is transversely provided at the attachment surface 112 of the casing 110 and is extended between the top and bottom surfaces thereof. When a second magnetic strip is used, the magnetic strip longitudinally provided at the attachment surface 112 of the casing 110 and is extended between the two side surfaces thereof. It is preferred two magnetic strips provided in a cross manner, wherein the longitudinal magnetic strip extends across the transverse magnetic strip at the attachment surface 112 of the casing 110. It would be appreciated that magnetic pins can be used as the replacement of the magnetic strip and can be embedded into the attachment surface 112 of the casing 110 in order to magnetically and detachably couple the casing 110 at the elongated shaft t2 of the tool T.

The leveling device 120 in the FIGS. 1 and 2 is a digital leveling device which comprises a measuring circuit 121 protected inside the casing 110. The measuring circuit 121 will measure the pedicle screw angle at a first x-y plane in 2-dimensional manner with respect to the pedicle axis of screw insertion. The measuring circuit 121 will optionally measure the pedicle screw angle at a second y-z plane in 2-dimensional manner with respect to the pedicle axis of screw insertion. That is to say, the measuring circuit 121 provides multi-directional capability to precisely measure the pedicle screw angle at 3-dimensional manner so as to determine the orientation of the pedicle screw PS. The leveling device 120 will keep measuring the pedicle screw angle during the movement of the tool T. Therefore, once the tool T is moved at the desired orientation with respect to the pedicle axis of screw placement, the pedicle screw PS can be placed into the pedicle and/or vertebral body.

A power source 122, i.e. a disposable battery, is sealed in the casing 110 and is electrically connected to the measuring circuit 121. It is preferred the power source 122 cannot be replaced from the casing 110 when the positioning measurer 100 is disposable far one time use for sterility purposes.

The positioning reader 140 is received at the casing 110 to form a one piece body, wherein the surgical angulation measurement instrument is disposable for one time use. It is preferred the casing 110 is sealed and wrapped by a sterile package, wherein the surgical angulation measurement instrument is unwrapped and removed from the sterile package before the use of the surgical angulation measurement instrument.

The positioning reader 140 comprises a display 141 provided on the casing 110 and linked to the measuring circuit 121 for indicating the orientation of the pedicle screw PS. The display 141 is a digital display provided at one of the side surfaces of the casing 110. It is preferred two displays 141 can be provided at both side surfaces of the casing 110 for ease of observation. The display 141 is arranged to display the pedicle screw angle at the first x-y plane in 2-dimensional manner with respect to the pedicle axis of screw placement. An additional display 141 can be provided at the front surface of the casing 110 and operatively linked to the measuring circuit 121 to display the pedicle screw angle at the second y-z plane in 2-dimensional manner with respect to the pedicle axis of screw placement. Therefore, 3-dimensional display of the orientation of the pedicle screw PS will be observed.

The positioning reader 140 further comprises a power control 142 and a set control 143 linked to the measuring circuit 121 and provided at the casing 110 at the front surface thereof preferably. The power control 142 selectively controls the power of the measuring circuit 121 in an on-and-off manner. When the measuring circuit 121 is powered off by the power control 142, the measuring circuit 121 will be reset. Once the measuring circuit 121 is powered on by the power control 142, the measuring circuit 121 will be initially and automatically calibrated with respect to the vertebral body orientation by manipulation of the operator. The set control 143 is to set and lock the pedicle screw angle with respect to the pedicle axis of screw placement. The function of the set control 143 will be disclosed later.

The positioning reader 140 further comprise a signal generator 144 for generating a notifying signal when the orientation of the pedicle screw PS is aligned with the pedicle axis of screw placement. The signal generator 144 can be a LED provided at the casing 110 for light notifying signal generation or a sound buzzer received at the casing 110 for sound notifying signal generation. As mentioned above, the pedicle screw angle of the pedicle screw PS can be set by the set control 143. Once the tool T is moved to align the pedicle screw angle of the pedicle screw PS with the pedicle axis of screw placement, the signal generator 144 will generate the notifying signal for notification. The signal generator 144 provides a solution of solving the asymmetrical alignment between the pair of pedicle screws PS. When the first pedicle screw PS is inserted at the pedicle screw angle, the pedicle screw angle of the first pedicle screw PS can be locked. Therefore, the second pedicle screw PS will be placed corresponding to the pedicle screw angle of the first pedicle screw PS by the notifying signal so as to improve the bilateral symmetry to the pedicle and/or vertebral body.

Figure 3A:
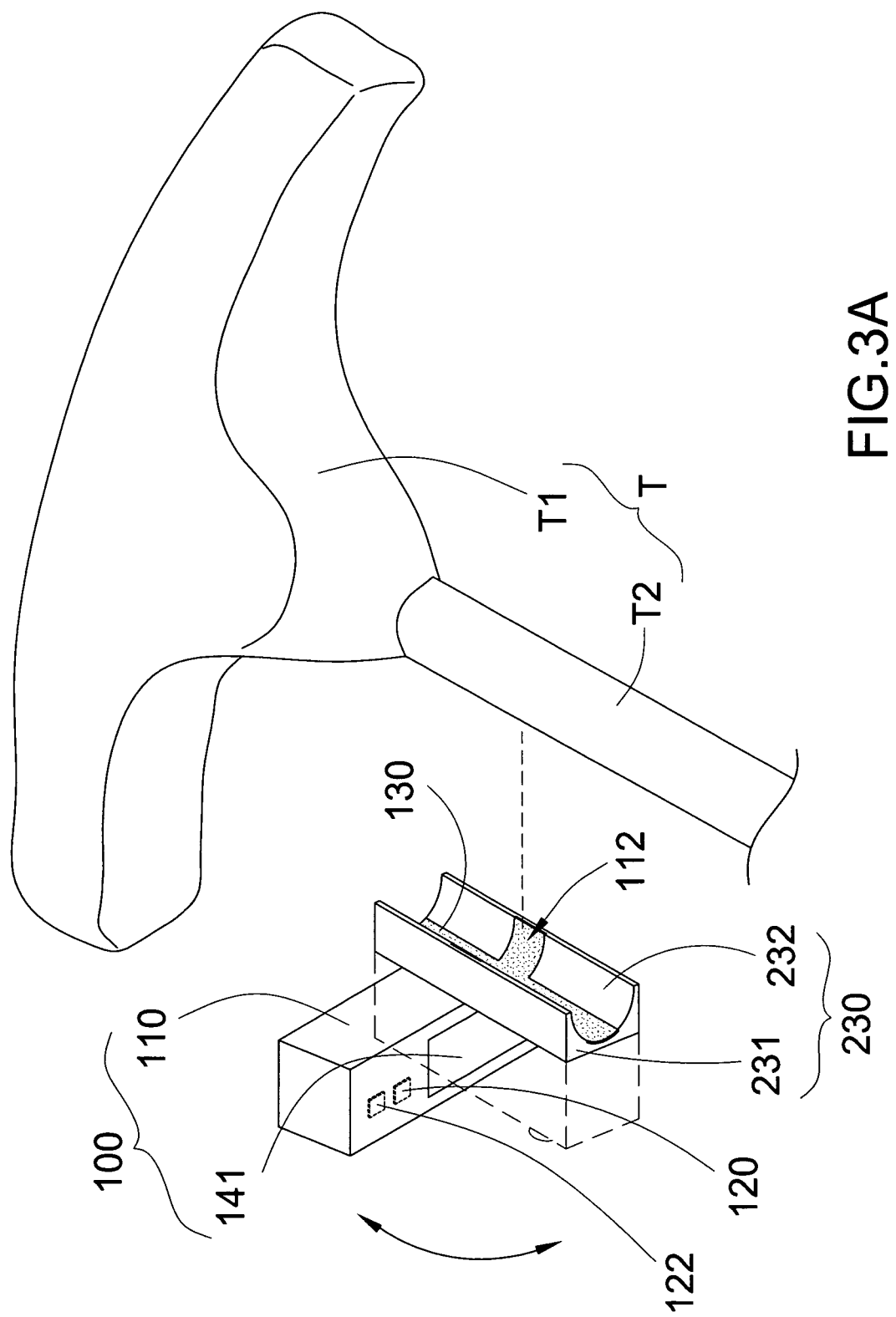
FIG. 3A shows an alternative of detachable attachment of the surgical angulation measurement instrument in accordance with the present invention.

FIG. 3A depicts another type of the coupling device 230 to detachably couple the casing 110 to the elongated shaft T2 of the tool T. The coupling device 230 comprises an extension plate 231 rotatable and extendable from the casing 110 to adjust the orientation of the casing 110 with respect to the elongated shaft T2 of the tool T. The attachment surface 112 is formed at the rear side of the extension plate 230 for coupling with the elongated shaft T2 of the tool T.

The coupling device 230 further comprises a clip-on device 232 provided at the casing 110 for detachably attaching the positioning measurer 100 to the tool T. The clip-on device 232 is preferred to form an elastic or plastic C-shaped clipping member formed at the rear side of the extension plate 231. The attachment surface 112 is formed at the inner surface of the clip-on device 232. Therefore, the clip-on device 232 provides a quick attachment to the elongated shaft T2 of the tool T and enables the positioning measurer 100 being quickly detached from the tool T. It should be appreciated that the clip-on device 232 can be directly formed at the rear surface of the casing 110 to detachably couple with the elongated shaft T2 of the tool T. The magnetic strips of the coupling device 130 can also formed at the attachment surface 112 to magnetically and detachably couple with the elongated shaft T2 of the tool T. Therefore, double-attachment is provided to secure the surgical angulation measurement instrument to the tool T with a detachable manner.

When the pedicle screw angle of the pedicle screw PS is set, the casing 110 can be detachably attached to and turned at the elongated shaft T2 of the tool T in order that the displays 124 can be easily viewed without blocking the operation of the tool T.

Figure 3B:
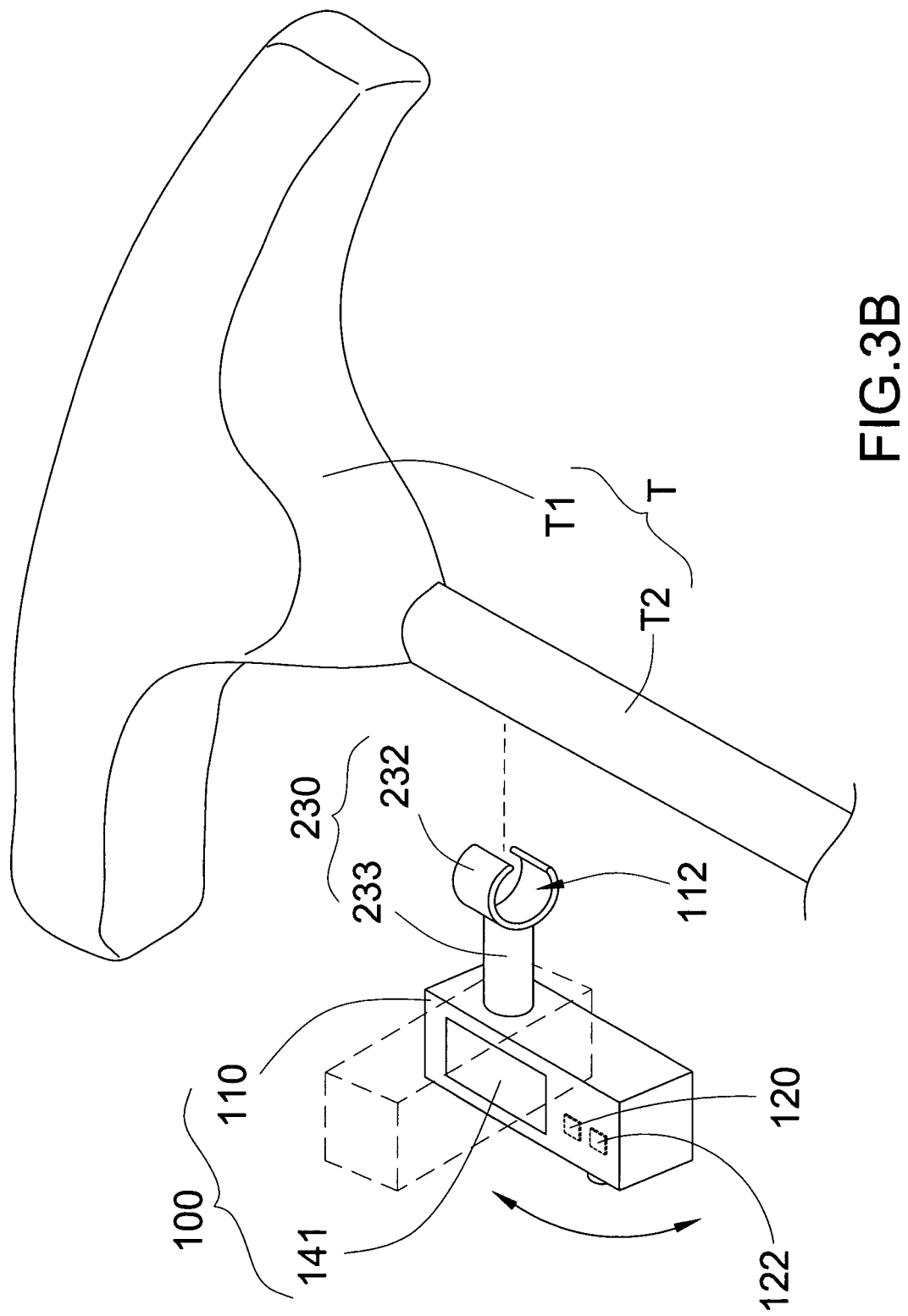
FIG. 3B shows another alternative of detachable attachment of the surgical angulation measurement instrument in accordance with the present invention.

FIG. 3B depicts another type of the coupling device 230 to detachably couple the casing 110 to the elongated shaft T2 of the tool T. The coupling device 230 comprises an extension arm 233 rotatable and extendable from the casing 110 to adjust the orientation of the casing 110 with respect to the elongated shaft T2 of the tool T, The attachment surface 112 is formed at the free end of the extension arm 233 for coupling with the tool T. The clip-on device 232 is preferred to form an elastic or plastic C-shaped clipping member formed at the free end of the extension arm 233. Therefore, the casing 110 is located away from the elongated shaft T2 of the tool T and is rotated to adjust the orientation of the casing 110 with respect to the elongated shaft T2 of the tool T when the extension arm 233 is coupled at the elongated shaft T2 of the tool T.

Figure 4:
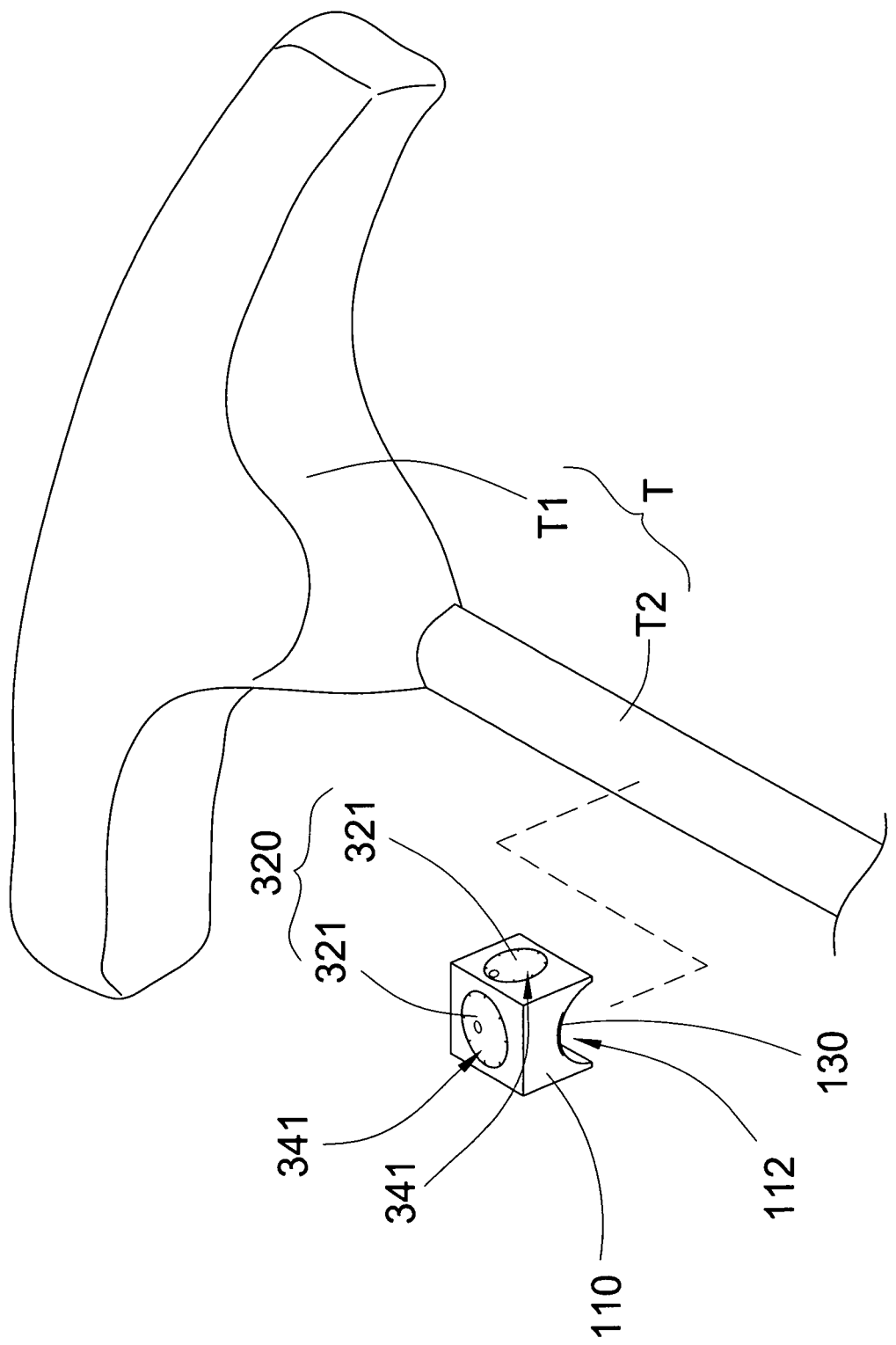
FIG. 4 shows an alternative of positioning measurer of the surgical angulation measurement instrument in accordance with the present invention.

FIG. 4 depicts another type of the leveling device 320 which is an analogy level type bubble leveling device and comprises a liquid contained element 321 protected in the casing 110 to allow a bubble inside the liquid contained element 321 being travel quickly so as to measure the pedicle screw angle. It is preferred two or more liquid contained element 321 provided at the casing 110 to measure the pedicle screw angle at the first x-y plane in 2-dimensional manner and the second y-z in 2-dimensional manner with respect to the pedicle axis of screw placement. The liquid contained element 321 will provide multi-directional capability to precisely measure the pedicle screw angle at 3-dimensional manner so as to determine the orientation of the pedicle screw PS.

The displays 341 are provided on the casing 110 at the front and two side surfaces thereof, wherein the displays 341 are slightly convex glass faces and has a plurality of angle indicators marked at the peripheral of each of the glass faces. When the bubble travels with respect to the orientation of the tool T, the orientation of the pedicle screw PS can be determined at the corresponding angle indicator so as to control the pedicle screw angle of the pedicle screw PS with respect to the pedicle axis of screw placement. In this analogy level type, no power source is required.

Figure 5:
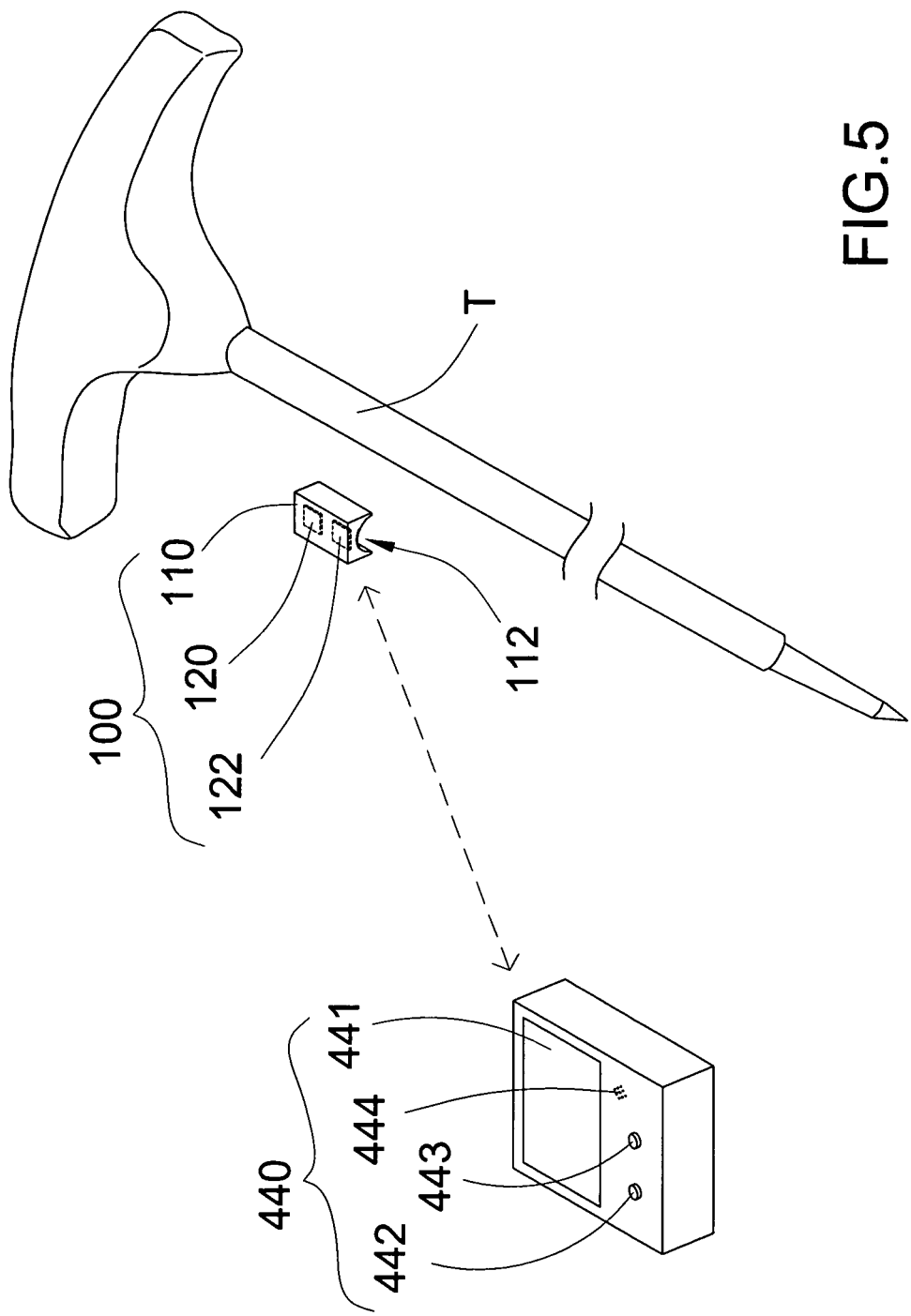
FIG. 5 shows the wireless link between the positioning measurer and the positioning reader of the surgical angulation measurement instrument in accordance with the present invention.

FIG. 5 depicts another type of the positioning reader 440 which is an individual unit. The positioning reader 440 is housed in an individual casing and is wirelessly connected to the positioning measurer 100 through wireless link. The wireless link comprises a wireless transmitter provided at the casing 110 to link with the leveling device 120 and a wireless receiver provided at the individual casing to link with the positioning reader 440. Then, the wireless connection is established between the wireless transmitter and the wireless receiver within a predetermined wireless connection range to send the measuring signal from the positioning measurer 100 to the positioning reader 440. The wireless link can be "Bluetooth", "WiFi", "RF", "Infrared" and the like. That is to say, the size of the casing 110 can be further minimized to detachably couple to the tool T via the coupling device 130. It is preferred that the positioning measurer 100 is disposable for one time use and the positioning reader 440 can be repeatedly used. As individual of the positioning reader 440, the positioning reader 440 can be connected to any computerized device for further precise determination.

The display 441 is provided on the individual casing and wirelessly linked to the positioning measurer 100 for indicating the orientation of the pedicle screw PS. The power control 442 and the set control 443 are provided at the individual casing and also wirelessly linked to the positioning measurer 100. The signal generator 444 is provided on the individual casing and wirelessly linked to the positioning measurer 100 for generating a notifying signal when the orientation of the pedicle screw PS is aligned with the pedicle axis of screw placement.

Figure 6:
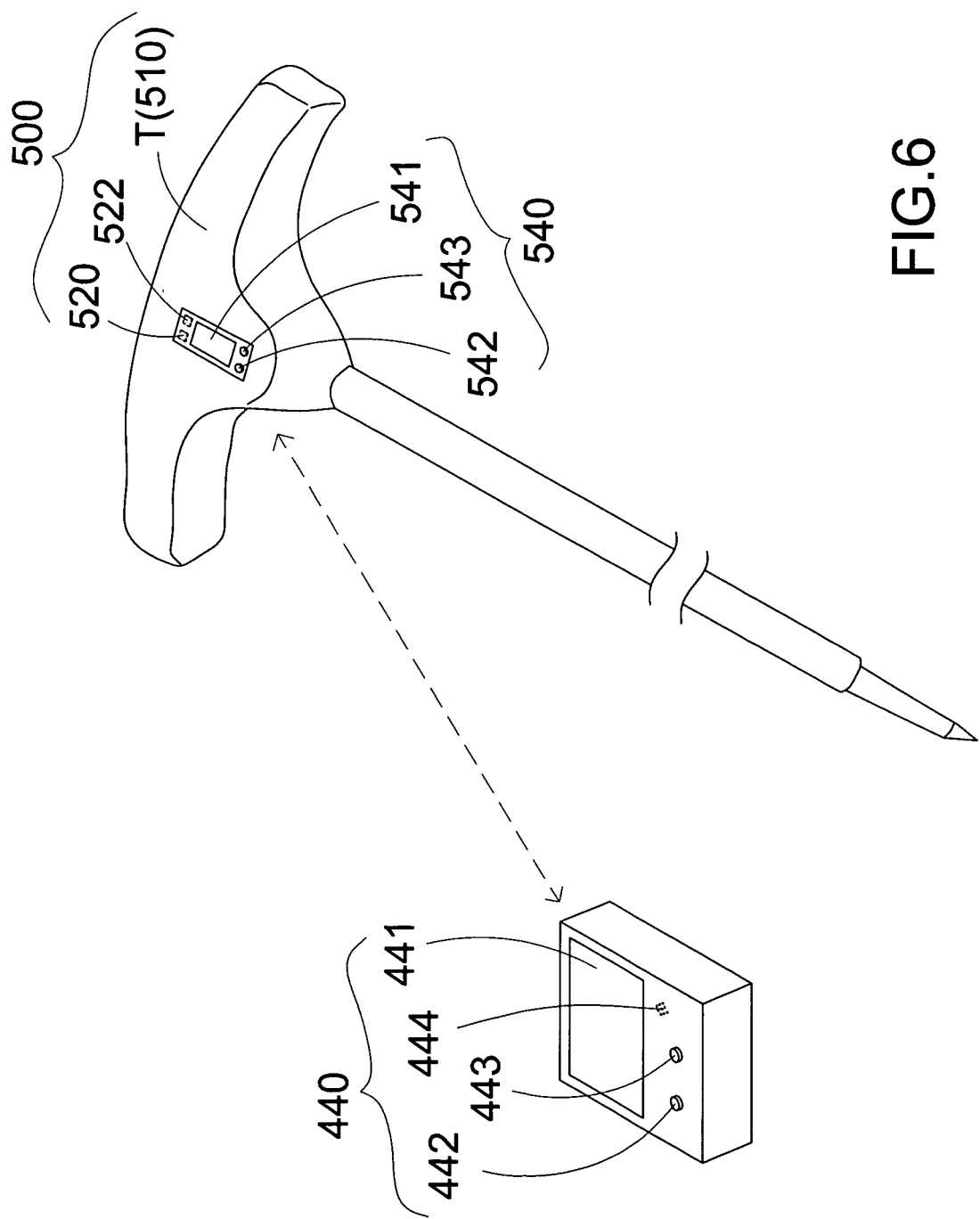
FIG. 6 shows the surgical angulation measurement instrument built-in with the tool in accordance with the present invention.

FIG. 6 depicts another type of the surgical angulation measurement instrument which is built-in with the tool T. That is to say, the positioning measurer 500 and the positioning reader 540 are built-in with the tool T. The casing 510 is integrated with the tool T to house the positioning measurer 500 and the positioning reader 540. The display 541, the power control 542 and the set control 543 are provided at an outer surface of the tool T. The power source 522 can be replaceable and received in the tool T.

It is appreciated that only the positioning measurer 500 is built-in with the tool T, wherein the positioning reader 440 is housed in an individual casing and is wirelessly connected to the positioning measurer 500 through wireless link as mentioned above.

The leveling device 520 of the positioning measurer 500 is the gyroscope provided in the tool T to measure the pedicle screw angle at x-y-z 3 dimensional direction with respect to the pedicle axis of screw placement and to send the measuring signal to the positioning reader 540.

Figure 7:
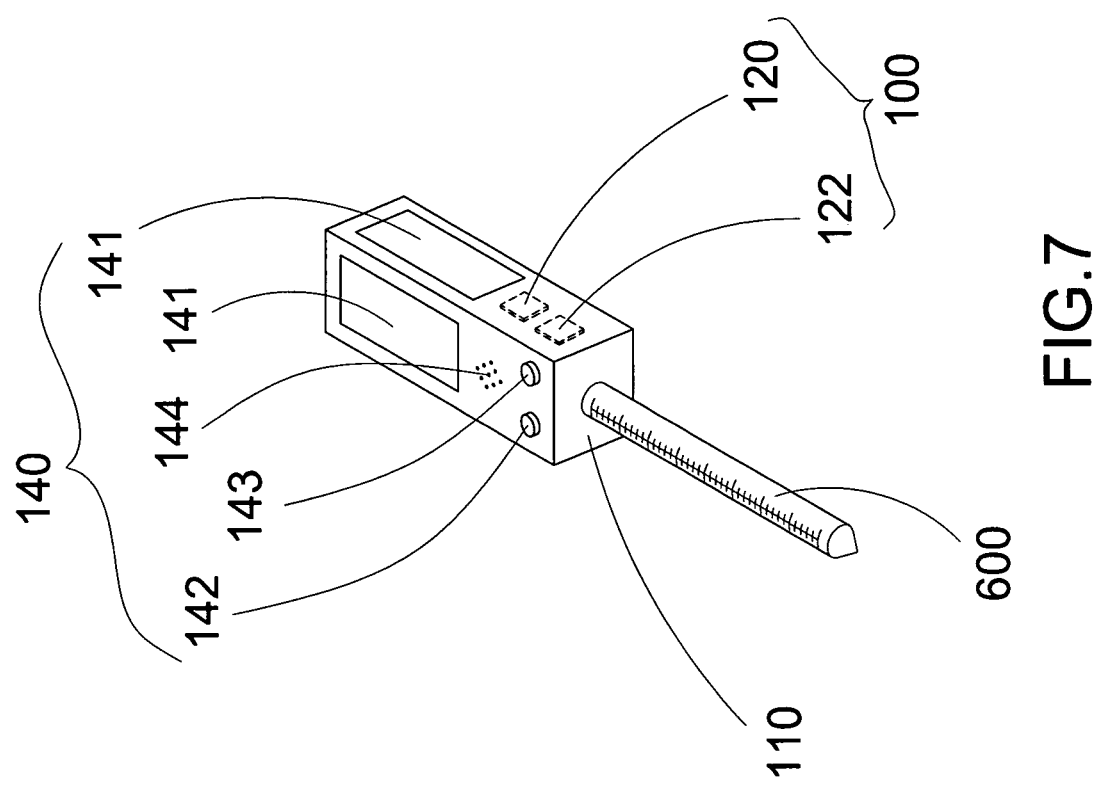
FIG. 7 shows the surgical angulation measurement instrument formed a pointer to be used as a pre-operation estimation of pedicle screw trajectory angle and depth in accordance with the present invention.

FIG. 7 depicts another type of the surgical angulation measurement instrument which is formed a pointer to be used as a pre-operation estimation of pedicle screw trajectory angle and depth. The surgical angulation measurement instrument is configured to have the same components of the first type to including the casing 110, leveling device 120, power source 122, and positioning reader 140. The coupling device 130 is omitted or optional. The surgical angulation measurement instrument further comprises an elongated pointer 600 downwardly extended from a bottom surface of the casing 110, wherein the pointer 600 is aligned with an axis matching with the axis of the elongated shaft T2 of the tool T as the casing 110 is coupled thereto. The pointer 600 is about 2 inches long consisting of incremental measuring points provided thereat and is preferably detachably coupled with the casing. Having the pointer 600 extended from the casing 110, the surgical angulation measurement instrument forms a tool simulator, wherein the surgeon can use it to measure the pedicle screw angle and depth to practice the use of the tool T before he or she performs the operation. That is to say, the surgical angulation measurement instrument in FIG. 7, which can be placed in the surgeon's room and can be reuse, is considered as a pre-operation device. It is appreciated the surgical angulation measurement instrument in FIG. 6 can also be considered as the tool simulator for the surgeon to practice the use of the tool T and to get the feeling of how to adjust the tool T with the orientation of the pedicle screw PS to align with the pedicle axis of screw insertion before the operation of the screw placement. It will further save the operating room time by practicing the screw adjustment.

In accordance with the instant invention, the method of using the surgical angulation measurement instrument to adjust the orientation of the pedicle screw PS with respect to the pedicle axis of screw placement, comprises the steps of:

(A) Calibrate the positioning measurer 100 with respect to the vertebral body orientation. The positioning measurer 100 is reset with respect to the vertebral body orientation.

(B) Attach the casing 110 to the elongated shaft T2 of the tool T. The casing 110 can be detachably coupled to the tool T by the coupling device 130. When the positioning measurer 500 is built-in with the tool T, no attachment step is required.

(C) Measure the orientation of the pedicle screw PS by the positioning measurer 100 being coupled with the tool T. When the tool T is moved, the positioning measurer 100 will keep measuring the orientation of the tool T in order to adjust the orientation of the pedicle screw PS.

(D) Indicate the orientation of the pedicle screw PS by the positioning reader 140. The positioning reader 140 will keep displaying the pedicle screw angle measured by the positioning measurer 100, wherein the tool T is moved at the position that the orientation of the pedicle screw is aligned with the pedicle axis of screw insertion.

(E) Dispose the positioning measurer 100 after being used.

Before the step (A), a practicing step can be performed to practice the use of the tool T and to get the feeling of how to adjust the tool T with the orientation of the pedicle screw PS to align with the pedicle axis of screw placement before the operation of the screw placement. The surgeon can hold the surgical angulation measurement instrument as the tool simulator to simulate the pointer 600 as the elongated shaft T2 of the tool T in order to adjust the orientation of the pedicle screw PS.

When a pair of pedicle screw is used, the first pedicle screw PS is implanted to the pedicle and/or vertebral body by the above mentioned steps.

For implanting the second pedicle screw PS, the method further comprises the steps between the step (D) and the step (E):

(i) After the first pedicle screw PS is done, lock the pedicle screw angle of the first pedicle screw PS by the lever reader 140.

(ii) Measure the orientation of the second pedicle screw PS by the positioning measurer 100 being coupled with the same tool T. When the tool T is moved, the positioning measurer 100 will keep measuring the orientation of the tool T in order to adjust the orientation of the second pedicle screw PS.

(iii) Indicate the orientation of the second pedicle screw PS by the positioning reader 140. The positioning reader 140 will keep displaying the second pedicle screw angle measured by the positioning measurer 100. Therefore, the second pedicle screw angle of the second pedicle screw PS can be adjusted to match with the first pedicle screw angle of the first pedicle screw PS.

(iv) Generate the notifying signal when the tool T is moved at the pedicle screw angle of the first pedicle screw PS. Therefore, the instant invention will improve the bilateral symmetry of the pedicle screws PS.

All distinguishing features of the surgical angulation measurement instrument are interchangeable. The leveling device can be any of one the analogy level, digital level, and gyroscope for angle measurement and can be interchangeable. The positioning measurer and the positioning reader can be formed in one single casing as a disposable unit. The lever measurer and the positioning reader can be formed in two individual casings and can be wirelessly connected together that the positioning measurer forms a disposable unit and the positioning reader forms a reusable unit. The lever measurer and the positioning reader can be built-in with the tool. Or, only the lever measurer is built-in with the tool and the positioning reader can be an individual unit to wirelessly connect to the positioning measurer.

All in all, the surgical angulation measurement instrument can improve surgical outcomes by providing the surgical angulation measurement instrument at the tool of the orthopedic instruments allowing for a precise measurement of the pedicle screw angle (lateral, cephalic, and/or caudal). The surgical angulation measurement instrument further improves the bilateral symmetry of the pedicle screws. Since the pedicle screw angle of the pedicle screw can be precisely measured, the surgical angulation measurement instrument can significantly decrease fluoroscopy exposure for the patient to determine the corrected alignment of the pedicle screw. Therefore, the operating room times for the pedicle screw placement will be significantly reduced. The surgical angulation measurement instrument is readily available and is good for disposable use, and the cost of surgical angulation measurement instrument is relatively inexpensive. The surgical angulation measurement instrument is compatible with any orthopedic instrument system to precisely measure the pedicle screw angle.

While the embodiments and alternatives of the present invention have been shown and described, it will be apparent to one skilled in the art that various other changes and modifications can be made without departing from the spirit and scope of the present invention.

What is claimed is:

1. A surgical angulation measurement instrument for a pedicle screw of an orthopedic instrumentation system, comprising a positioning measurer and a positioning reader linked to said positioning measurer, said positioning measurer includes a coupling device with magnetic strips adapted for magnetically coupling with a tool to implant said pedicle screw in order to measure an orientation of said pedicle screw with respect to a pedicle axis of screw placement, said positioning reader arranged for indicating said orientation of said pedicle screw in a display provided at a first front surface, arranged to display the pedicle screw angle at a first position in an x-y plane in a 2-dimensional manner with respect to the pedicle axis of screw placement and an additional display provided at a second side surface, arranged to display the pedicle screw angle at a second position in a y-z plane in the 2-dimensional manner with respect to the pedicle axis of screw placement, and notifying a user when the orientation of said pedicle screw is being aligned with said pedicle axis of screw placement.

2. The surgical angulation measurement instrument of claim 1 wherein said positioning measurer comprises a casing for detachably coupling with said tool and a leveling device received in said casing for measuring an orientation of said pedicle screw, wherein said leveling device is selected from the group consisting of analogy level, digital level, and gyroscope.

3. The surgical angulation measurement instrument of claim 1 wherein said coupling device comprises a magnetic element provided at an attachment surface of said casing for magnetically attaching said positioning measurer to said tool.

4. The surgical angulation measurement instrument of claim 3 wherein said attachment of said casing is a concave surface for coupling with an elongated shaft of said tool.

5. The surgical angulation measurement instrument of claim 1 wherein said coupling device comprises a clip-on device provided at said casing for detachably attaching said positioning measurer to said tool.

6. The surgical angulation measurement instrument of claim 4 wherein said casing further comprises an extension arm rotatably extended
therefrom and defines said attachment surface at a free end of said extension arm for coupling with said tool.

7. The surgical angulation measurement instrument of claim 5 wherein said casing further comprises an extension plate rotatably extended therefrom and forms said clip-on device at a rear side of said extension plate for coupling with said tool.

8. The surgical angulation measurement instrument of claim 1 wherein said positioning measurer is wirelessly linked to said positioning reader.

9. The surgical angulation measurement instrument of claim 1 wherein said positioning reader comprises a display for indicating said orientation of said pedicle screw and a signal generator for generating a notifying signal when said orientation of said pedicle screw is aligned with said pedicle axis of screw placement.

10. The surgical angulation measurement instrument of claim 1 wherein said positioning measurer is disposable for one time use.

11. The surgical angulation measurement instrument of claim 2 further comprising an elongated pointer, having a plurality of increment measuring points provided thereat, downwardly extended from said casing, wherein an axis of said pointer is configured for matching with an axis of said tool when said casing is for coupled with said tool, so that said surgical angulation measurement instrument is a pre-operation device for practicing the use of said tool and to get a feeling of how to adjust said tool with said orientation of said pedicle screw to align with said pedicle axis of screw placement.

* * * * *